(12) United States Patent
Park (10) Patent No.: US 9,568,610 B2
(45) Date of Patent: Feb. 14, 2017

(54) POSITIONING METHOD BASED ON RELIABILITY AND APPARATUS THEREOF

(71) Applicant: ELECTRONICS AND TELECOMMUNICATIONS RESEARCH INSTITUTE, Daejeon (KR)

(72) Inventor: Manho Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 120 days.

(21) Appl. No.: 14/571,326

(22) Filed: Dec. 16, 2014

(65) Prior Publication Data

US 2015/0189618 A1     Jul. 2, 2015

(30) Foreign Application Priority Data

Dec. 31, 2013   (KR) .......................... 10-2013-0169069

(51) Int. Cl.
*H04W 64/00*        (2009.01)
*G01S 19/48*        (2010.01)

(52) U.S. Cl.
CPC ..................................... *G01S 19/48* (2013.01)

(58) Field of Classification Search
CPC ....... H04W 64/00; H04W 4/02; H04W 64/003
USPC .............................................. 455/456.1–457
See application file for complete search history.

(56) References Cited

U.S. PATENT DOCUMENTS

| 2007/0060170 | A1* | 3/2007 | Fukui | G01S 5/0215 |
| | | | | 455/456.1 |
| 2012/0112960 | A1 | 5/2012 | Joo et al. | |
| 2012/0116677 | A1* | 5/2012 | Higgison | G01S 5/0027 |
| | | | | 701/518 |
| 2013/0102335 | A1* | 4/2013 | Katagi | H04W 4/02 |
| | | | | 455/457 |
| 2013/0184006 | A1* | 7/2013 | Yamaguchi | H04W 16/18 |
| | | | | 455/456.1 |

FOREIGN PATENT DOCUMENTS

| KR | 10-0723680 B1 | 5/2007 |
| KR | 10-2010-0059214 A | 6/2010 |

* cited by examiner

*Primary Examiner* — Kamran Afshar
*Assistant Examiner* — Farideh Madani
(74) *Attorney, Agent, or Firm* — Rabin & Berdo, P.C.

(57) ABSTRACT

According to a positioning method of estimating a position of a terminal by being connected with a plurality of positioning, in the state in which a first reference position is calculated based on absolute coordinate positional information provided from one positioning resource, when a second reference position based on new absolute coordinate positional information from the positioning resource and reliability of the second reference position are calculated, an update of an reference position for user position estimation is optionally performed depending on whether the reliability of the second reference position satisfies a preset reference position update reference.

16 Claims, 4 Drawing Sheets

(a) USER POSITION CORRESPONDING GEOGRAPHIC INFORMATION (b) EXAMPLE OF CORRESPONDING IMAGE ANALYSIS

(a) USER POSITION CORRESPONDING
GEOGRAPHIC INFORMATION (b) EXAMPLE OF CORRESPONDING
IMAGE ANALYSIS

FIG. 4

POSITIONING METHOD BASED ON RELIABILITY AND APPARATUS THEREOF

CROSS-REFERENCE TO RELATED APPLICATION

This application claims priority to and the benefit of Korean Patent Application No. 10-2013-0169069 filed in the Korean Intellectual Property Office on Dec. 31, 2013, the entire contents of which are incorporated herein by reference.

BACKGROUND OF THE INVENTION (a) Field of the Invention

The present invention relates to a positioning method and a positioning apparatus, and more particularly, to a positioning method measuring a position of a user based on reliability, and an apparatus thereof.

(b) Description of the Related Art

Recently, personal digital assistants which may provide positional information have been spreading rapidly, and the number of services which may provide positional and geographic information through the portable digital assistants are also quickly growing. To keep up with the tendency, attempts to smoothly provide a seamless positioning service which is a combination of an absolute positioning solution such as a global navigation satellite system (GNSS) and a WiFi positioning system (WPS) using WiFi information, a dead reckoning solution measuring a relative position such as an inertial navigation system (INS) having a multiple sensor structure, and the like, breaking from the existing services which provide only outdoor positional information, have continued.

A method for increasing positioning reliability by estimating current position related information (for example, whether a user is indoors or outdoors, and the like) affecting the calculation of reliability of an absolute position used for the dead reckoning and positioning-related resource information which are acquired by these systems and using the position related information for the dead reckoning has been frequently researched.

However, the method for determining a current position of a user using signals or distribution characteristics of positioning related resources such as the commonly used GNSS or Wi-Fi has accuracy changed depending on situations, and therefore hardly ensures the stable positioning reliability.

The GNSS-based positioning has relatively high reliability in the environment such as an open area and provides positioning quality of relatively high accuracy, and therefore has been considered as the positioning service which is most widely used. However, since it is difficult to acquire the GNSS signal in an environment such as the interior of a room, a basement, and downtown buildings, in terms of service characteristics, there is a drawback in that the services may be restricted. Further, in the case of an urban area which is becoming a main target of the positioning service, as the user approaches a building, influences of refraction, reflection, interruption, etc., of a signal are serious, such that an error may be increased and thus the reliability may be reduced.

Therefore, researches to provide a GNSS service to a boundary area or the interior of a room using a pseudolite method and the like have been frequently conducted, but have restrictions in public spreading and commercialization.

Meanwhile, the Wi-Fi based WiFi positioning system (WPS) is a method of estimating the position using an access point of a wireless local area network (WLAN) network, and estimates a position by allowing a terminal to measure a signal strength transferred from APs and calculate a signal transmitting distance depending on signal attenuation. The method is very effective in a downtown area or an interior of a room in which the density of APs is high. However, in the case the exterior of a room or the suburbs in which the density of APs is low, there is a drawback in that the reliability is greatly degraded and the performance thereof shows a big difference, depending on the distribution characteristics of the APs.

To solve the above problems, many researches to provide the positioning service by continuously connecting the positioning technologies having different service areas and characteristics have been conducted. As the representative method, there is a method of estimating positioning services having a dominant quality for each region by using the signals and the distribution characteristics of each service resource, and when the user continuously moves in a region in which positioning resource distribution characteristics are different, providing the positioning service having higher reliability and higher accuracy based on a service transformation boundary point. Further, there is a method of providing a seamless positioning service by introducing a third information transfer means, such as a beacon, which radiates a signal capable of confirming the positioning service to the transformation point of the region.

However, the method of using the signals and the distribution characteristics of the resources has a measurement value which is excessively changed depending on the environment in which the user is located to cause a large error, and makes the service region transformation time of the user and the transformation time when the positioning service is provided different to increase the transformation time estimation error, thereby reducing the reliability. Further, the method of using a third information providing means needs to construct an additional transfer service therefor in advance, which acts as restriction to provide actual services.

The above information disclosed in this Background section is only for enhancement of understanding of the background of the invention and therefore it may contain information that does not form the prior art that is already known in this country to a person of ordinary skill in the art.

SUMMARY OF THE INVENTION

The present has been made in an effort to provide a positioning method and a positioning apparatus having advantages of providing a positioning service having higher reliability at the time of providing a seamless positioning service to a user who continuously moves in a region having different positioning resource distributions using a dead reckoning service.

An exemplary embodiment of the present invention provides a positioning method of estimating a position of a terminal by being connected with a plurality of positioning resources, including: estimating, by a positioning apparatus, a position of a user and calculating reliability of the estimated position of the user for the estimated position of the user, based on a first reference position depending on a first absolute coordinate position received from a positioning resource; calculating, by the positioning apparatus, a second reference position and reliability of the second reference position, based on a second absolute coordinate position received from the positioning resource; determining, by the positioning apparatus, whether the reliability of the second reference position satisfies a preset reference position update reference; updating, by the positioning apparatus, an reference position for user position estimation from the first reference position to the second reference position when the reliability of the second reference position satisfies the reference position update reference; and newly estimating, by the positioning apparatus, the position of the user based on the updated second reference position and calculating reliability of the estimated position of the user for the estimated position of the user.

The determining may include: comparing the reliability of the estimated position of the user with the reliability of the second reference position; and determining that the reliability of the second reference position satisfies the reference position update reference, when a value of the reliability of the second reference position is larger than that of the reliability of the estimated position of the user, exceeding a set value.

The positioning method may further include calculating a weight in consideration of environmental characteristics for the position of the user by allowing the positioning apparatus to receive and analyze geographic information on the position of the user. In the calculating of the second reliability, the reliability of the second reference position may be corrected based on the weight.

In the calculating of the weight, the weight may be calculated in additional consideration of a kind of positioning systems which are the positioning resources providing an absolute coordinate position in addition to the environmental characteristics for the position of the user. The positioning system may include a global navigation satellite system (GNSS) and a WiFi position system (WPS) using Wi-Fi information.

The calculating of the weight may include: as an analysis result of the geographic information, when the number of objects discriminated as buildings in the corresponding region is more than a set number and a percentage of buildings in the entire region is higher than a set percentage, a current position of the user is estimated as a downtown area; when the number of objects discriminated as the buildings in the region is smaller than the set number and the percentage of the buildings in the entire region is lower than the set percentage, the current position of the user is estimated as being positioned in a suburban area or an open area; allocating a first weight when the position of the user is estimated as being positioned in a downtown area and the positioning system is the WPS and allocating a second weight having a lower value than the first weight when the position of the user is estimated as being positioned in the suburban area or the open area and the positioning system is the WPS; and allocating the second weight when the position of the user is estimated as being positioned in the downtown area and the positioning system is the GNSS and allocating the first weight when the position of the user is estimated as being positioned in the suburban area or the open area and the positioning system is the GNSS.

The reliability may be calculated based on an inverse of an error radius based on the position, and the weight may be additionally applied to the error radius.

The positioning method may further include keeping, by the positioning apparatus, the reference position for the user position estimation as the first reference position when the reliability of the second reference position does not satisfy the reference position update reference.

A positioning resource providing the first absolute coordinate position may be the same as a positioning resource providing the second absolute coordinate position. A positioning resource providing the first absolute coordinate position may be different from a positioning resource providing the second absolute coordinate position.

Another embodiment of the present invention provides a positioning apparatus for estimating a position of a terminal by being connected with a plurality of positioning resources, including: a positioning resource information receiving unit configured to receive absolute coordinate positional information provided from the positioning resources; an reference position calculation unit configured to calculate an reference position for user position estimation and reliability of the reference position based on the absolute coordinate positional information; an reference position update unit configured to determine whether reliability of a second reference position satisfies a preset reference position update reference and update whether the reference position is updated, when the second reference position based on a new absolute coordinate positional information from the positioning resources and the reliability of the second reference position are calculated, in the state in which the first reference position is calculated; and a dead reckoning unit configured to estimate a position of a user based on the reference position and calculate the reliability of an estimated position of the user for the estimated position of the user, wherein the dead reckoning unit newly estimates the position of the user based on the second reference position and newly calculates the reliability of the corresponding estimated position of the user when the reliability of the second reference position satisfies the preset reference position update reference.

The reference position update unit may determine that the reliability of the second reference position satisfies the reference position update reference when the reliability of the second reference position is larger than that of the reliability of the estimated position of the user for the position of the user calculated based on the first reference position, exceeding a set value.

The positioning apparatus may further include a weight setting unit configured to calculate a weight in consideration of environmental characteristics for the position of the user by allowing the positioning apparatus to receive and analyze geographic information on the position of the user. The reference position update unit may correct the reliability of the second reference position based on the weigh value and determine whether the corrected reliability of the second reference position satisfies the reference position update reference The reliability may be calculated based on an inverse of an error radius which is based on the position, the error radius may satisfy $C_{position\_weighted} = W_{region} \cdot C_{Position}$, $W_{region}$ may represent the weight, and $C_{position}$ may represent the error radius of the corresponding position calculated prior to applying the weight.

When the position of the user is estimated as being positioned in a downtown area, a first weight may be allocated, when the position of the user is estimated as being positioned in a suburban area or an open area, a second weight may be allocated, and the first weight may be higher than the second weight.

The weight calculation unit may calculate the weight in additional consideration of a kind of positioning systems which are the positioning resources providing the absolute coordinate position in addition to the environmental characteristics.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

In the specification and claims, unless explicitly described to the contrary, the word "comprise" and variations such as "comprises" or "comprising" will be understood to imply the inclusion of stated elements but not the exclusion of any other elements.

Hereinafter, a positioning method and a positioning apparatus according to an exemplary embodiment of the present invention will be described.

When a user receives a seamless positioning service based on a dead reckoning service, like a global navigation satellite system (GNSS) or a WiFi positioning system (WPS), a dead reckoning system uses positioning resources such as Wi-Fi to measure an absolute position for the user, provides the positioning service based on the measured absolute position, and tracks the position of the user using various types of sensor information at the time of the movement of the user, thereby seamlessly providing the positioning service.

The dead reckoning system based on the dead reckoning service sets an initial position based on an absolute coordinate position which is provided from the positioning resources (like the GNSS or the WPS, a system providing absolute position positioning information), and also calculates the position of the user and an error radius thereof based on a kind of positioning systems and various measurement values which are used for position estimation. In this case, reliability of a positioning result may generally be measured based on the inverse of a reliable error radius value.

Next, depending on the movement of the user, the dead reckoning system uses a navigation sensor (sensors embedded in a terminal) to estimate a relative moving distance and direction of the user, and combines the estimated moving distance and direction with the initial position which is a reference to estimate and serve a final position of the user.

In the dead reckoning system using an embedded navigation sensor, such as a gyroscope, an acceleration sensor (accelerator), and a geomagnetic sensor (magnatometer), the measurement error of the navigation sensor is increased depending on the moving distance or time of the user, such that positioning precision may tend to be reduced. Therefore, for the reliability of the positioning result based on the dead reckoning, the error radius based on a positioning technique used at the time of setting the initial position may be considered to be proportionately increased depending on the time, the moving distance, or a specific moving pattern.

In detail, when the initial position, which is set by being estimated based on the absolute coordinate positioning information (absolute position) provided from the positioning resources, that is, an error radius of an reference position, is set to be $C_{anchor}$, an error radius $C_{pdr}$ for the position of the user moving a predetermined distance from the reference position may be calculated as follows.

$$C_{pdr}=C_{anchor}+l \cdot C_l+n_t \cdot C_t+n_u \cdot C_u+n_v \cdot C_v \qquad \text{(Equation 1)}$$

In the above Equation 1, $C_{anchor}$ represents the error radius of the reference position calculated depending on the estimation method using the absolute position, l represents the dead reckoning moving distance of the user, that is, the dead reckoning terminal, and $C_l$ represents an increment of the error radius for a unit distance. $n_t$ represents the number of rotations left or right when the dead reckoning terminal moves, $C_t$ represents an increment of the error radius for left and right rotation, $n_u$ represents the number of rotations of 180°, and $C_u$ represents an increment of the error radius for a 180° rotation. Further, $n_v$ represents the number of vertical movements in a vertical direction when the navigation terminal moves, and $C_v$ represents an increment of the error radius at the time of the vertical movement.

In the case of the general dead reckoning service, a starting point (reference position) of one section is set by the absolute coordinate positional information including the absolute coordinate position, the change in relative position of the user is calculated based on the dead reckoning algorithm, and then the dead reckoning service is performed based on the position, in which the starting point is kept up to the next absolute position measurement point.

According to the exemplary embodiment of the present invention, to provide the positioning service having higher reliability, the starting point which is a reference to perform the dead reckoning service is changed based on the reliability.

In detail, the reference position is set based on the absolute coordinate positional information provided from the positioning system (like the GNSS or the WPS, a system providing an absolute coordinate position), and the reliability of the absolute coordinate positional information measurement is set to be the reliability of the reference position. Next, the position of the user is estimated based on the dead reckoning depending on the movement of the user, and at the same time, the reliability of the estimated position of the user is calculated based on the dead reckoning characteristics.

When the measurement of the reference position and the reliability succeeds by receiving new absolute coordinate positional information, a new reference position to provide the dead reckoning system is set depending on the result obtained by comparing the reliability of the currently estimated position of the user with the reliability of the reference position measured based on the information provided from the positioning system. For example, when the reliability of the reference position measured based on the new absolute coordinate positional information provided from the positioning system satisfies a set reference position update reference, the reference position measured based on new information provided from the positioning system is set to be the new reference position and the reliability of the reference position is updated. However, when the reliability of the reference position measured based on the new information provided from the positioning system does not satisfy the set reference position update reference, a seamless positioning service is provided based on the estimated position and reliability of a current terminal.

Figure 1:
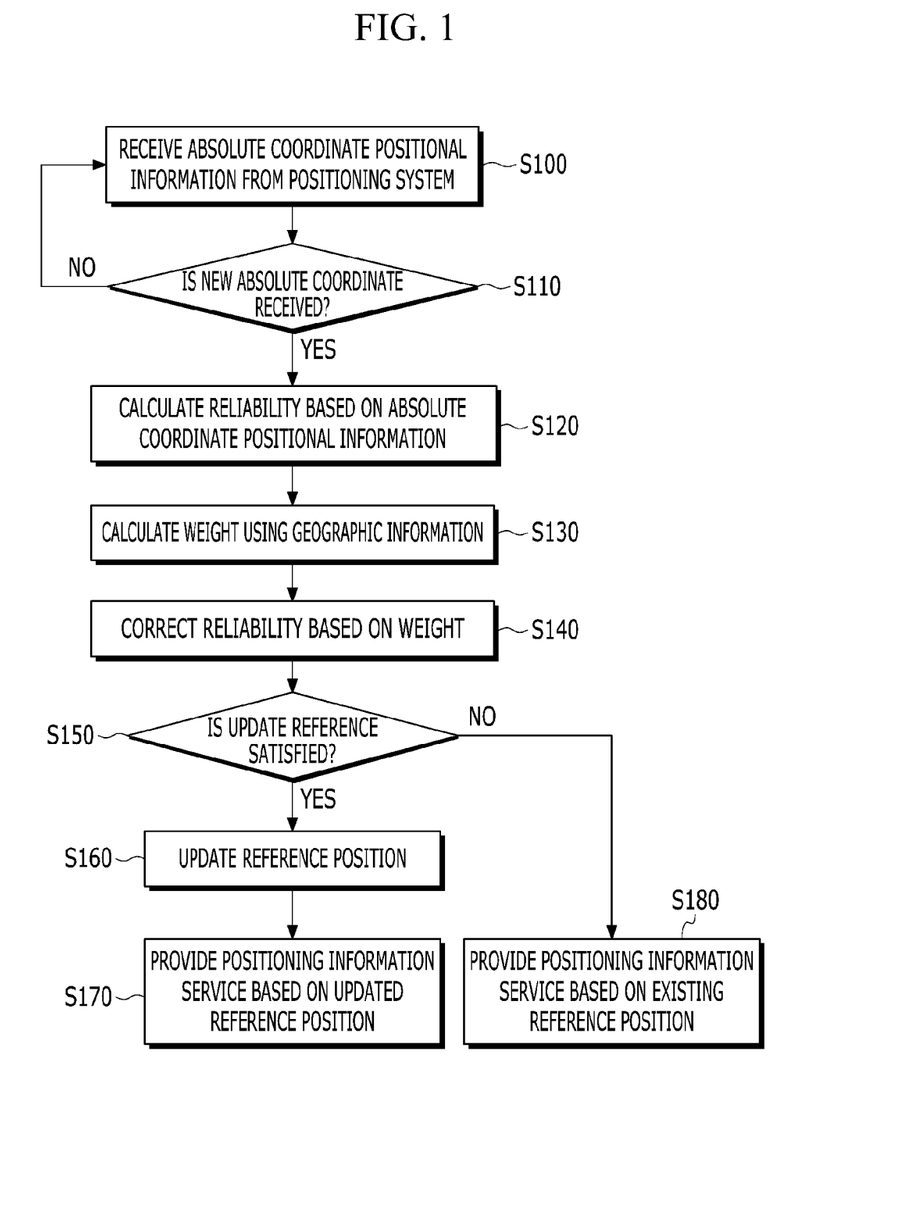
FIG. 1 is a flowchart of a positioning method according to an exemplary embodiment of the present invention.
Figure 2:
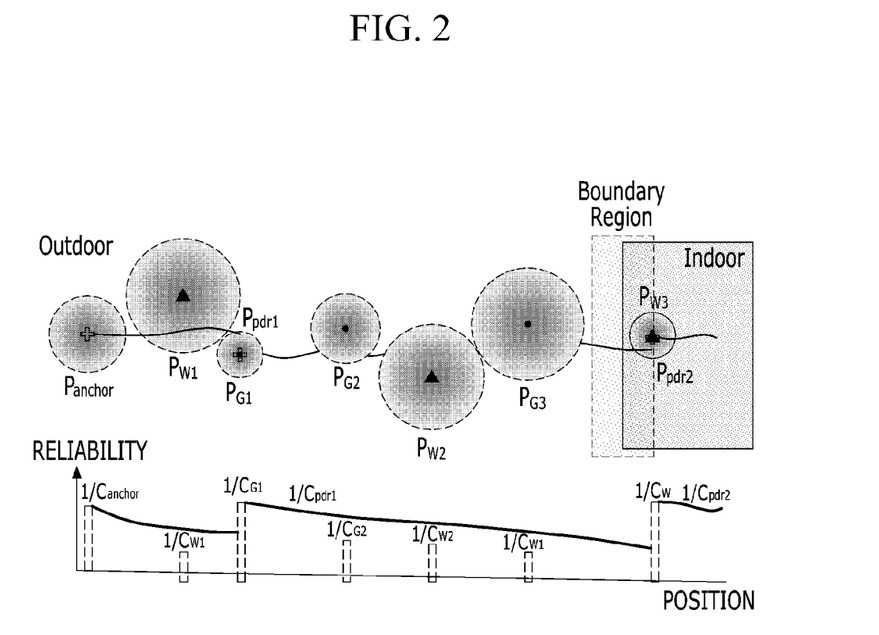
FIG. 2 is a diagram illustrating the environment in which a dead reckoning service to which the positioning method according to the exemplary embodiment of the present invention is applied is provided.

FIG. 1 is a flowchart of a positioning method according to an exemplary embodiment of the present invention, and FIG. 2 is a diagram illustrating the environment in which a dead reckoning service to which the positioning method according to the exemplary embodiment of the present invention is applied is provided.

The positioning apparatus of the terminal may be configured in a form which receives the information from the positioning system providing the absolute coordinate position like the GNSS or the WPS and the system providing the relative coordinate position such as the dead reckoning, or includes the systems.

The positioning apparatus sets the reference position for user position estimation based on the absolute coordinate position of the positioning system. Further, the error radius for the set reference position is calculated and the reliability is calculated based on the inverse of the calculated error radius. Next, depending on the movement of the terminal, the positioning apparatus performs the dead reckoning based on the information collected from a plurality of navigation sensors mounted in the terminal to measure the change in relative position (moving distance, moving direction, and the like) of the user based on the set reference position, and combines the estimated change in position with the reference position to estimate the position of the user. Depending on the dead reckoning, the position of the user and the reliability of the position of the user corresponding thereto, that is, the reliability of the estimated position of the user, is calculated.

Meanwhile, the reliability of the determination for the region transformation point may be increased by correcting the reliability of the positioning resources in consideration of the environmental characteristics in which the user is positioned.

At the time of the reliability based on the reference position, the reliability of the corresponding positioning system may be controlled by allocating a weight considering the environmental characteristics of where the user is positioned.

For this purpose, a new weight is calculated as follows by applying the weight to the error radius for the position.

$$C_{position\_weighted} = W_{region} \cdot C_{Position} \quad \text{(Equation 2)}$$

In the above Equation 2, $W_{region}$ represents the weight considering the environmental characteristics of where the user is positioned, depending on the positioning system, and $C_{position}$ represents the error radius of the corresponding position calculated prior to applying the weight. The reliability may be calculated in consideration of the environmental characteristics of where the user is positioned, based on the inverse of the error radius $C_{position\_weighted}$ to which the weight $W_{region}$ is applied.

Meanwhile, the weight considering the environmental characteristics of where the user is positioned may be set based on morphological/distributional information estimation on the user surrounding position or neighboring buildings which are based on the geographic information used by the user.

If it is assumed that "Seoul City Hall" is searched using, for example, a geographic information system (GIS), the geographic information may be longitude and latitude information which is received corresponding to Seoul City Hall. Alternatively, the geographic information may be detailed additional information, such as a main number, an address, and additional information (for example, the nature of a corresponding building (public institution, gas station, restaurant, and the like)). In addition, the geographic information may be information which represents a spatial relationship of a map by adding topologic information spatially representing a position and non-graphic attribute information describing and supplementing the form and the function thereof.

The morphological/distributional information on the user surrounding position or the neighboring buildings may be estimated by allowing the terminal of the user to analyze and process the geographic information used at a predetermined time interval or a predetermined distance interval during the movement of the user which uses the dead reckoning service.

Figure 3:
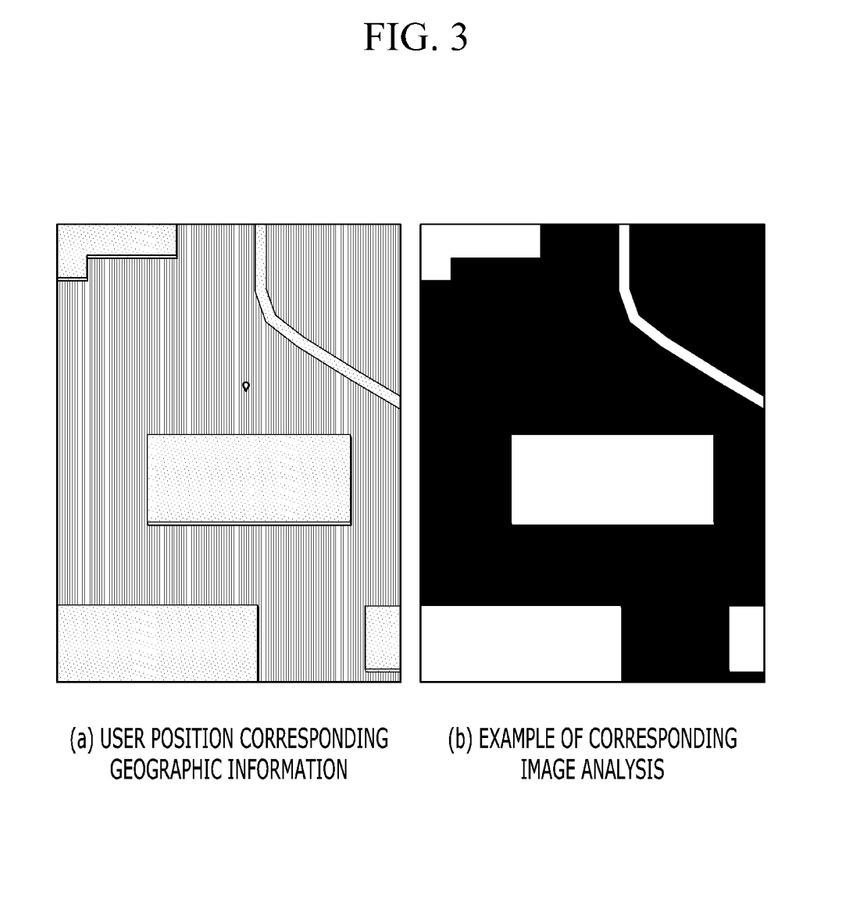
FIG. 3 shows exemplary diagrams illustrating information acquired depending on a geographic information analysis according to an exemplary embodiment of the present invention.

FIG. 3 shows exemplary diagrams illustrating information acquired depending on a geographic information analysis according to an exemplary embodiment of the present invention.

The morphological/distributional information on the user surrounding position or the neighboring buildings as illustrated in (a) and (b) of FIG. 3 may be acquired by processing geographic information with an image processing technique based on the terminal or the server and the weight considering the environmental characteristics of where the user is positioned may be allocated based on the acquired morphological/distributional information.

For example, as illustrated in (a) of FIG. 3, when the user position corresponding geographic information acquired by the terminal of the user is provided, the position of the user and the corresponding geographic information are analyzed based on the image processing technique to be able to obtain a result as illustrated in (b) of FIG. 3.

As illustrated in (a) and (b) of FIG. 3, as the analysis result of the geographic information around the user, when the number of objects discriminated as buildings in the corresponding region is more than a set number and the percentage of the buildings in the entire region is higher than a set percentage, the current position of the user may be estimated as the downtown area. To the contrary, when the number of objects discriminated as the buildings in the corresponding region is smaller than the set number and the percentage of the buildings in the entire region is lower than the set percentage, the current position of the user may be estimated as being positioned in a suburban area or an open area.

When the user is estimated as being positioned in the downtown area in consideration of the environmental characteristics of the current position of the user, a first weight is allocated, and when the user is estimated as being positioned in the suburban areas or the open area, a second weight is allocated. Herein, the first weight may be higher than the second weight.

As such, the reliability allocated with the weight based on the geographic information may be used.

Meanwhile, when the weight is allocated in consideration of the environmental characteristics based on the geographic information, the weight may be allocated in additional consideration of a kind of positioning system providing the absolute coordinate positional information. The GNSS (or GPS) performs more accurate measurement in the suburbs than in the town. Therefore, when the measurement system providing the absolute coordinate position is the GNSS, the weight for the error radius may be set to be lower in the suburbs and may be set to be higher in the town, such that the weight for the reliability may be set to be higher in the suburbs and may be set to be lower in the town.

Unlike this, in the case of the WPS, since the number of available WiFis is many in the case of the town and the density of the WiFis is low in the case of the suburbs, the WPS performs more accurate measurement in the town than in the suburbs. Therefore, when the measurement system providing the absolute coordinate position is the WPS, the weight for the error radius may be set to be lower in the town and may be set to be higher in the suburb, such that the weight for the reliability may be set to be lower in the suburbs and may be set to be higher in the town.

Therefore, considering the environmental characteristics for the current position of the user and the kind of positioning systems, for example, when the user is estimated as being positioned in the downtown area and the positioning system is the GNSS, the reliability is allocated with the second weight, and when the user is estimated as being positioned in the suburbs or the open area and the positioning system is the GNSS, the reliability is allocated with the first weight higher than the second weight. On the other hand, when the user is estimated as being positioned in the downtown area and the positioning system is the WPS, the reliability is allocated with the first weight, and when the user is estimated as being positioned in the suburbs or the open area and the positioning system is the WPS, the reliability is allocated with the second weight lower than the first weight. Herein, differently from using the first weight and the second weight, the allocated weights depending on the kind of positioning systems may be different. For example, in the case of the GNSS, the first weight and the second weight (first weight>second weight) are used, in the case of the WPS, a third weight and a fourth weight (third weight>fourth weight) are used, and the first to fourth weights may each have different values.

As such, the weights considering the environmental characteristics may be set based on the kind of positioning systems and the geographic information available rather than only on the geographic information.

Meanwhile, in the state in which the positioning system providing the position of the user based on the reference position is performed, when the positioning apparatus receives the absolute coordinate position from the positioning system, as illustrated in FIG. 1, it is determined whether the received absolute coordinate position is a new absolute coordinate position (S100 and S110). When the new absolute coordinate position is received, the positioning apparatus determines whether the new absolute coordinate position is a region transformation point at which the positioning needs to be performed based on the reference position. The region transformation point means the time when the positioning resources used in the positioning service need to be transformed as the terminal moves to a region in which different positioning resources (satellite, and the like) are distributed.

Herein, for convenience of description, the absolute coordinate position where the positioning apparatus is previously received from the positioning system is called a first absolute coordinate position, and a preset reference position based on the first absolute coordinate position is called a "first reference position" while the reliability thereof is called "first reliability". Further, an absolute coordinate position newly received from the positioning system is called a second absolute coordinate position, and the reference position set based on the second absolute coordinate position is called a "second reference position" while the reliability thereof is called "second reliability".

When the positioning information of the reference position used in the current positioning service is $L_{anchor}$, the positioning information $L_{anchor}$ may be configured of positional information $P_{anchor}$ and error radius information $C_{anchor}$ as illustrated in FIG. 2. When the current positioning information of the user newly measured using the new information received from the positioning system such as the GPS and the WiFi is $L_{now}$, the positioning information $L_{now}$ may be configured of positional information $P_{now}$ and error radius information $C_{now}$. The positional information $P_{now}$ represents $P_{w1}$, $P_{G1}$, $P_{w2}$, $P_{G2}$, and $P_{G3}$ in FIG. 2 and the error radius information $C_{now}$ represents $C_{w1}$, $C_{G1}$, $C_{w2}$, $C_{G2}$, and $C_{G3}$ in FIG. 2. For example, the first reliability may be calculated based on the inverse of the error radius $C_{anchor}$ which is the reliability information corresponding the first reference position $P_{anchor}$, and the second reliability may be calculated based on the inverse of the error radius $C_{W1}$ which is the reliability information corresponding to the second reference position (for example, $P_{W1}$) based on the newly received absolute coordinate position. In this case, when the newly measured positioning information has a smaller error than the positioning information related to the current reference position and thus is determined to be precise, that is, when the reliability is high, the measured current positional information may be used as the new reference position. This will be represented by the following Equation 3. In the following Equation 3, δ represents a set threshold value (or set value).

if $C_{ankor} > \delta \cdot C_{now}$ $$L_{ankor} = L_{now} \qquad \text{(Equation 3)}$$

Meanwhile, the positioning system which provides the first absolute coordinate position and the second absolute coordinate position may be the same positioning system or may be different positioning systems. For example, the positioning system providing the first and second absolute coordinate positions may be the GNSS, or the positioning system providing the first absolute coordinate position may be the GNSS and the positioning system providing the second absolute coordinate position may be the WPS using the WiFi.

The positioning apparatus sets the second reference position which is the new reference position based on the new absolute coordinate position received from the positioning system, that is, the second absolute coordinate position, and calculates the second reliability which is the reliability of the set second reference position (S120).

Herein, the positioning apparatus generates the weight using the geographic information as described above in consideration of the environmental characteristics of where the user is positioned, and applies the generated weight to the reliability based on the newly received absolute coordinate position, that is, the second reliability (S130 and S140). For example, based on the result obtained by analyzing the geographic information, when the position of the user is estimated as being positioned in the downtown area, the first weight may be allocated, and when the position of the user is estimated as being positioned in the suburbs or the open area, the second weight lower than the first weight may be allocated. Herein, the positioning apparatus may allocate the first weight or the second weight to the reliability in additional consideration of the kind of positioning systems providing the absolute coordinate position. The positioning apparatus applies the weight considering the environmental characteristics to the second reliability to correct the second reliability.

By the above processes, the reliability of the determination for the region transformation point may be increased by correcting the reliability of the positioning resources in consideration of the environmental characteristics of where the user is positioned. Further, as in the case in which the user moves from the exterior of a room to the interior of a room, the case in which the user moves from an area in which one positioning resource distribution characteristic is dominant to an area in which another positioning resource distribution characteristic is dominant may be simultaneously discriminated with the positioning, and the more reliable dead reckoning service may be provided by controlling the reliability of each positioning resource in consideration of the environmental characteristics in which the user is positioned.

In order to determine whether the new reference position is the region transformation point at which the positioning needs to be performed, as illustrated in FIG. 1, the positioning apparatus determines that the second reliability based on the newly received absolute coordinate position satisfies the preset reference position update reference (S150). In order to determine whether the second reliability satisfies the reference position update reference, for example, if it determined that the value of the second reliability is larger than that of the first reliability, exceeding the set value by comparing the value of the reliability (first reliability) based on the previously received absolute coordinate with the value of the reliability (second reliability) based on the newly provided absolute coordinate position, it may be determined that the second reliability satisfies the reference position update reference.

When the second reliability satisfies the preset reference position update reference, the reference position for the positioning service is changed to a newly acquired second reference position at the first reference position, and the position of the user is newly estimated based on the changed second reference position and the reliability of the estimated position of the user is updated (S160 and S170). However, when the second reliability does not satisfy the preset reference position update reference, the seamless positioning service is provided based on the currently estimated position of the user depending on the existing reference position (i.e., first reference position) and the user position estimation reliability (S180).

Figure 4:
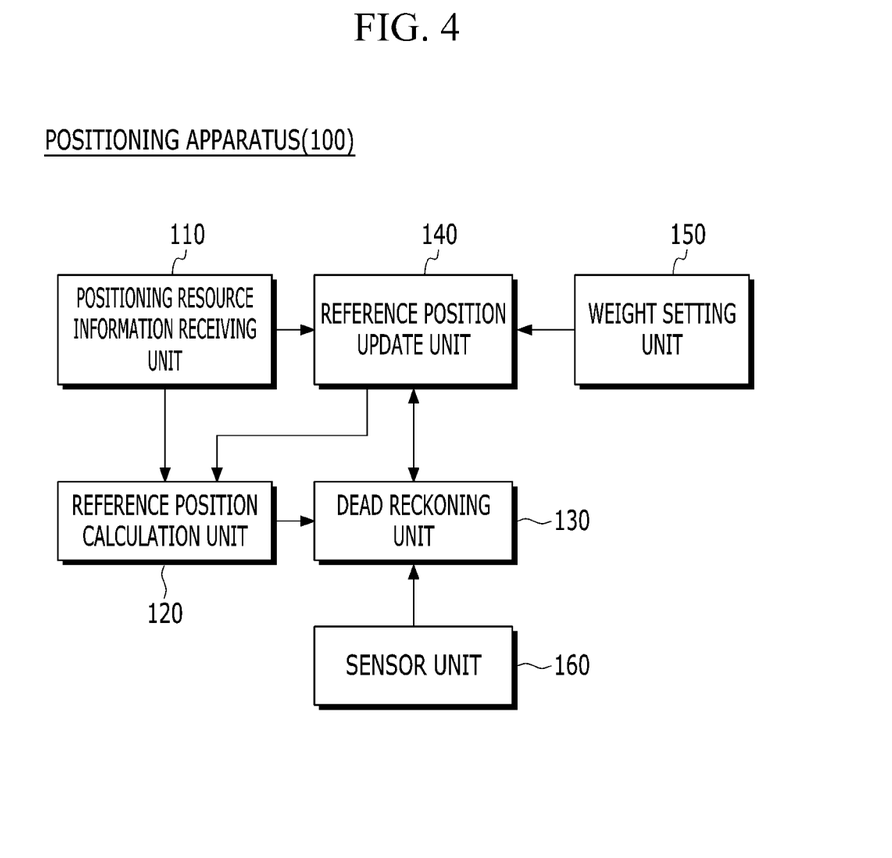
FIG. 4 is a diagram illustrating a structure of a positioning apparatus according to an exemplary embodiment of the present invention.

Meanwhile, at the time of calculating the reliability, applying the weight based on the geographic information may be selectively performed. FIG. 4 is a diagram illustrating a structure of a positioning apparatus according to an exemplary embodiment of the present invention.

As illustrated in FIG. 4, a positioning apparatus 100 according to the exemplary embodiment of the present invention may further a positioning resource information receiving unit 110, an reference position calculation unit 120, a dead reckoning unit 130, an reference position update unit 140, and a weight setting unit 150, and may further include a sensor unit 160 which includes the plurality of navigation sensors.

The positioning resource information receiving unit 110 receives the absolute coordinate positional information from the positioning resources (a first positioning system, a second positioning system, and the like).

The reference position calculation unit 120 sets the reference position for the positioning service based on the absolute coordinate positional information received from the positioning resources, and calculates the corresponding reliability.

The dead reckoning unit 130 performs the dead reckoning based on the reference position and the information collected from the plurality of navigation sensors 160 to measure the change in relative position (moving distance, moving direction, and the like) of the user based on the reference position, and combines the estimated change in position with the reference position to estimate the position of the user and calculate the reliability of the estimated position of the user corresponding thereto.

When the reference position update unit 140 receives the new absolute coordinate positional information from the positioning resource and receives the corresponding new reference position from the reference position calculation unit 120 and the reliability corresponding thereto, the reference position update unit 140 determines whether the newly provided reliability satisfies a reference position update reference. When the new reliability satisfies the reference position update reference, the reference position update unit 140 updates the reference position for the dead reckoning to the new reference position, and the dead reckoning unit 130 updates the position of the user and the reliability of the estimated position of the user based on the updated reference position.

The weight setting unit 150 analyzes the received geographic information to set the weight considering the environmental characteristics corresponding to the position of the user. Further, the set weight is provided to the reference position update unit 140.

The reference position update unit 140 corrects the new reliability based on the weight and determines whether the corrected reliability satisfies the reference position update reference based on the corrected reliability, thereby determining whether the reference position is updated.

According to the exemplary embodiments of the present invention, it is possible to estimate the user positioning result service using the positioning reliability and the reliable region transformation point, in providing the seamless positioning service to the user who continuously moves in the region having the different positioning resource distributions using the dead reckoning service.

Further, it is possible to improve the reliability of the dead reckoning service by allowing the user to use the positioning reliability when the user using the dead reckoning service uses the new absolute positioning information while receiving the dead reckoning position service based on the absolute positioning information such as the GNSS, by performing the dead reckoning technique based on the positioning reliability and region characteristics reflecting technique.

Further, it is possible to improve the general positioning quality of service by serving the more realistic and reliable positioning service by estimating the region characteristics using the geographic information-based user position and the building information and reflecting the estimated region characteristics to the positioning.

The exemplary embodiments of the present invention are not implemented only by the apparatus and/or method as described above, but may be implemented by programs realizing the functions corresponding to the configuration of the exemplary embodiments of the present invention or a recording medium recorded with the programs, which may be readily implemented by a person having ordinary skill in the art to which the present invention pertains from the description of the foregoing exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A positioning method of estimating a position of a terminal by being connected with a plurality of positioning resources, comprising:

estimating, by a positioning apparatus, a position of a user and calculating reliability of an estimated position of the user for the estimated position of the user, based on a first reference position depending on a first absolute coordinate position received from a positioning resource;

calculating, by the positioning apparatus, a second reference position and reliability of the second reference position, based on a second absolute coordinate position received from the positioning resource;

determining, by the positioning apparatus, whether the reliability of the second reference position satisfies a preset reference position update reference;

updating, by the positioning apparatus, a reference position for user position estimation from the first reference position to the second reference position when the reliability of the second reference position satisfies a reference position update reference; and newly estimating, by the positioning apparatus, the position of the user based on the updated second reference position and calculating reliability of the estimated position of the user for the estimated position of the user, wherein the reliability of the second reference position is corrected based on a weight that is calculated based on environmental characteristics for the position of the user and kinds of positioning systems which are the positioning resources providing the absolute coordinate position.

2. The positioning method of claim 1, wherein the determining includes:

comparing the reliability of the estimated position of the user with the reliability of the second reference position; and determining that the reliability of the second reference position satisfies the reference position update reference, when a value of the reliability of the second reference position is larger than that of the reliability of the estimated position of the user, exceeding a set value.

3. The positioning method of claim 1, further comprising calculating a weight in consideration of environmental characteristics for the position of the user by allowing the positioning apparatus to receive and analyze geographic information on the position of the user, wherein in the calculating of the second reliability, the reliability of the second reference position is corrected based on the weight.

4. The positioning method of claim 3, wherein in the calculating of the weight, the weight is calculated in additional consideration of a kind of positioning systems which are the positioning resources providing an absolute coordinate position in addition to the environmental characteristics for the position of the user.

5. The positioning method of claim 4, wherein the positioning resources include one or more of a global navigation satellite system (GNSS) and a WiFi position system (WPS) using Wi-Fi information.

6. The positioning method of claim 5, wherein the calculating of the weight includes:

as an analysis result of the geographic information, when the number of objects discriminated as buildings in the corresponding region is more than a set number and a percentage of the buildings in the entire region is higher than a set percentage, a current position of the user is estimated as a downtown area;

when the number of objects discriminated as the buildings in the region is smaller than the set number and the percentage of the buildings in the entire region is lower than the set percentage, the current position of the user is estimated as being positioned in a suburban area or an open area;

allocating a first weight when the position of the user is estimated as being positioned in a downtown area and the positioning system is the WPS and allocating a second weight having a lower value than the first weight when the position of the user is estimated as being positioned in the suburban area or the open area and the positioning system is the WPS; and allocating the second weight when the position of the user is estimated as being positioned in the downtown area and the positioning system is the GNSS and allocating the first weight when the position of the user is estimated as being positioned in the suburban area or the open area and the positioning system is the GNSS.

7. The positioning method of claim 3, wherein the reliability is calculated based on an inverse of an error radius based on the position, and the weight is additionally applied to the error radius.

8. The positioning method of claim 1, further comprising keeping, by the positioning apparatus, the reference position for the user position estimation as the first reference position when the reliability of the second reference position does not satisfy the reference position update reference.

9. The positioning method of claim 1, wherein a positioning resource providing the first absolute coordinate position is the same as a positioning resource providing the second absolute coordinate position.

10. The positioning method of claim 1, wherein a positioning resource providing the first absolute coordinate position is different from a positioning resource providing the second absolute coordinate position.

11. A positioning apparatus for estimating a position of a terminal by being connected with a plurality of positioning resources, comprising:

a positioning resource information receiving unit configured to receive absolute coordinate positional information provided from the positioning resources;

a reference position calculation unit configured to calculate a reference position for user position estimation and reliability of the reference position based on the absolute coordinate positional information;

a reference position update unit configured to determine whether a reliability of a second reference position satisfies a preset reference position update reference and update whether the reference position is updated, when the second reference position based on a new absolute coordinate positional information from the positioning resources and the reliability of the second reference position are calculated, in the state in which the first reference position is calculated; and a dead reckoning unit configured to estimate a position of the user based on the reference position and calculate the reliability of an estimated position of the user for the estimated position of the user, wherein the dead reckoning unit newly estimates the position of the user based on the second reference position and newly calculates the reliability of the corresponding estimated position of the user when the reliability of the second reference position satisfies the preset reference position update reference, and wherein the reliability of the second reference position is corrected based on a weight that is calculated based on at least one among environmental characteristics for the position of the user and kinds of positioning systems which are the positioning resources providing the absolute coordinate position in addition to the environmental characteristics.

12. The positioning apparatus of claim 11, wherein
the reference position update unit determines that the reliability of the second reference position satisfies the reference position update reference when the reliability of the second reference position is larger than that of the reliability of the estimated position of the user for the position of the user calculated based on the first reference position, exceeding a set value.

13. The positioning apparatus of claim 11, further comprising
a weight setting unit configured to calculate a weight in consideration of environmental characteristics for the position of the user by allowing the positioning apparatus to receive and analyze geographic information on the position of the user, wherein the reference position update unit corrects the reliability of the second reference position based on the weigh value and determines whether the corrected reliability of the second reference position satisfies the reference position update reference.

14. The positioning apparatus of claim 13, wherein the reliability is calculated based on an inverse of an error radius which is based on the position, the error radius satisfies, $C_{position\_weighted} = W_{region} \cdot C_{Position}$; $W_{region}$ represents the weight, and $C_{position}$ represents the error radius of the corresponding position calculated prior to applying the weight.

15. The positioning apparatus of claim 13, wherein
when the position of the user is estimated as being positioned in a downtown area, a first weight is allocated, when the position of the user is estimated as being positioned in a suburban area or an open area, a second weight is allocated, and the first weight is higher than the second weight.

16. The positioning apparatus of claim 13, wherein
the weight calculation unit calculates the weight in additional consideration of a kind of positioning systems which are the positioning resources providing the absolute coordinate position in addition to the environmental characteristics.

* * * * *